United States Patent [19]  
Higuchi et al.

[11] Patent Number: 4,911,861  
[45] Date of Patent: Mar. 27, 1990

[54] POLYPHENYL-BASED ESTER COMPOUNDS AND LIQUID CRYSTAL COMPOSITIONS CONTAINING SAME

[75] Inventors: Ryoichi Higuchi, Tokyo; Takao Sakurai; Tatsuru Tabohashi, both of Kawasaki; Naoko Mikami, Yokohama; Kiriko Akaiwa, Tokyo; Eri Yamamoto; Koji Takeuchi, both of Yokohama, all of Japan

[73] Assignee: Ajinomoto Co., Inc., Tokyo, Japan

[21] Appl. No.: 121,071

[22] Filed: Nov. 16, 1987

Related U.S. Application Data

[62] Division of Ser. No. 827,449, Feb. 10, 1986, Pat. No. 4,728,458.

[30] Foreign Application Priority Data

Feb. 8, 1985 [JP] Japan ................. 60-22920  
Apr. 24, 1985 [JP] Japan ................. 60-87034  
May 30, 1985 [JP] Japan ................. 60-117053  
Jul. 23, 1985 [JP] Japan ................. 60-162656

[51] Int. Cl.[4] .............. C09K 19/12; C07C 69/78; C07C 69/96  
[52] U.S. Cl. ............... 252/299.65; 252/299.01; 250/350 S; 558/270; 558/271; 558/273; 560/59; 560/65; 560/66; 560/83; 560/86  
[58] Field of Search ............. 252/299.01, 299.64, 252/299.65, 299.66, 299.68; 350/350 S; 558/270, 271, 273; 560/59, 65, 66, 83, 86

[56] References Cited

U.S. PATENT DOCUMENTS

| | | | |
|---|---|---|---|
| 4,576,732 | 3/1986 | Isogai et al. | 252/299.65 |
| 4,589,996 | 5/1986 | Inoue et al. | 252/299.65 |
| 4,592,858 | 6/1986 | Higuchi et al. | 252/299.66 |
| 4,596,667 | 6/1986 | Inukai et al. | 252/299.65 |
| 4,613,209 | 9/1986 | Goodby et al. | 350/350 S |
| 4,614,609 | 9/1986 | Inoue et al. | 252/299.66 |
| 4,647,398 | 3/1987 | Saito et al. | 252/299.65 |
| 4,668,427 | 5/1987 | Saito et al. | 252/299.66 |
| 4,710,585 | 12/1987 | Taguchi et al. | 252/299.65 |
| 4,737,313 | 4/1988 | Saito et al. | 252/299.65 |
| 4,780,242 | 10/1988 | Miyazawa et al. | 252/299.65 |
| 4,798,680 | 1/1989 | Nohira et al. | 252/299.65 |
| 4,816,181 | 3/1989 | Miyazawa et al. | 252/299.65 |
| 4,828,754 | 5/1989 | Takehara et al. | 252/299.65 |

FOREIGN PATENT DOCUMENTS

| | | | |
|---|---|---|---|
| 136725 | 4/1985 | European Pat. Off. | 252/299.65 |
| 164814 | 12/1985 | European Pat. Off. | 252/299.65 |
| 188222 | 7/1986 | European Pat. Off. | 252/299.65 |
| 197677 | 8/1986 | European Pat. Off. | 252/299.65 |
| 240385 | 10/1986 | German Democratic Rep. | 252/299.65 |
| 240386 | 10/1986 | German Democratic Rep. | 252/299.66 |
| 61-22051 | 1/1986 | Japan | 252/299.65 |
| 62-181237 | 8/1987 | Japan | 252/299.65 |
| 62-181238 | 8/1987 | Japan | 252/299.65 |

Primary Examiner—John F. Terapane  
Assistant Examiner—J. E. Thomas  
Attorney, Agent, or Firm—Oblon, Spivak, McClelland, Maier & Neustadt

[57] ABSTRACT

Polyphenyl-based liquid crystal compounds represented by the following general formula (1) and liquid crystal composition containing the same:

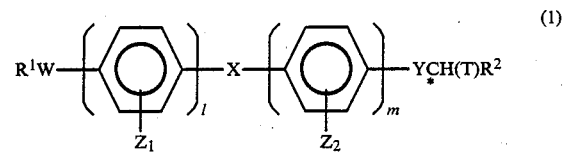

wherein $R^1$ represents a straight or branched $C_{1-18}$ alkyl group, haloalkyl group, aralkyl group or haloaralkyl group with or without optically active carbon, $R^2$ represents a straight or branched $C_{1-6}$ alkyl group, haloalkyl group or aralkyl group with or without optically active carbon, W represents (1) —OCO— or —COO—, in which case T represents a halogen atom or a methyl group, or (2) a single bond, —O— or —OCOO—, in which case T represents a halogen atom, X represents —OCO—, —COO—, —C≡C—, —CH=N—, —N=CH, Y represents single bond, —O—, —COO—, —OCO—, —CH₂—, —OCH₂—, —COOCH₂— or —OCOCH₂—, $Z_1$ and $Z_2$ represent a hydrogen or halogen atom, a cyano group or nitro group, $Z_1$ may be the same or different from $Z_2$, l and m are one or more than one each and a total of l and m is three or more than three, the carbon atom marked with * is an asymmetric carbon atom.

4 Claims, 1 Drawing Sheet

POLYPHENYL-BASED ESTER COMPOUNDS AND LIQUID CRYSTAL COMPOSITIONS CONTAINING SAME

This is a division of application Ser. No. 06/827,449, filed Feb. 10, 1986, now U.S. Pat. No. 4,728,458.

BACKGROUND OF THE INVENTION (1) Field of the Invention

This invention relates to new liquid-crystal compounds and to liquid crystal compositions containing the same, particularly smectic liquid crystal compositions.

The liquid-crystal compounds herein include those compounds which are useful as a component of liquid crystal compositions even though they do not exist in the form of liquid crystal.

(2) Description of the Related Art

Twisted nematic (TN) and dynamic scatter (DS) types, both employing nematic liquid crystal cells, are the modes of liquid-crystal display most extensively used at present. One disadvantage of conventional nematic liquid crystal cells is low response speeds (on the order of milliseconds at the highest), which limit the use of this type of liquid crystal cells.

It has recently been found that higher response speeds can be achieved by smectic liquid crystal cells and that some of optically active smectic compounds are ferroelectricity. The ferroelectric liquid crystals are a group of compounds which are ferroelectricity when they exist as chiral smectic C (hereinafter abbreviated as "SmC*") phase and are typified by 2-methylbutyl 4-(4-n-decyloxybenzylideneamino)cinnamate (hereinafter abbreviated as "DOBAMBC") of the following structural formula [J. Physique, 39, L-69 (1975)],

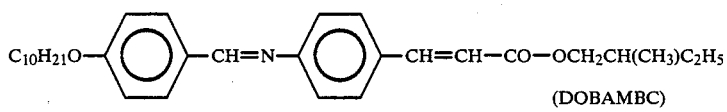

(DOBAMBC)

More recently N. A. Clark et al. [Appl. Phys. Lett., 36, 89 (1980)] found that very high response speeds on the order of microseconds can be achieved by thin-film DOBAMBC cells. Since then ferroelectric liquid crystals have been receiving attention not only as a material for display in liquid-crystal TV sets, but also as an element for opto-electronics devices (e.g., photo printer heads, optical Fourier transformation elements, and light valves).

DOBAMBC remains ferroelectric only within a relatively narrow temperature range, and is unsatisfactory in physical and chemical stability because it is a Schiff base. Hence there has been a great demand for new ferroelectric compounds which are stable both physically and chemically, remain ferroelectric over a wide temperature range, have large dielectric constant, and can be driven at a low voltage.

SUMMARY OF THE INVENTION

In one aspect of the present invention, there is provided polyphenyl-based compounds represented by the following general formula (1) and liquid crystal compositions containing the same:

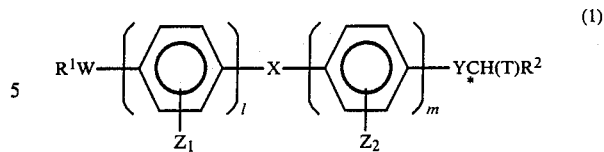

wherein $R^1$ represents a straight or branched $C_{1-18}$ alkyl group, haloalkyl group, aralkyl group or haloaralkyl group with or without optically active carbon, $R^2$ represents a straight or branched $C_{1-6}$ alkyl group, haloalkyl group or aralkyl group with or without optically active carbon, W represents (1) —OCO— or —COO—, in which case T represesnts a halogen atom or a methyl group, or (2) a single bond, —O— or —OCOO—, in which case T represents a halogen atom, X represents —OCO—, —COO—, —C≡C—, —CH=N—, or —N=CH—, Y represents single bond, —O—, —COO—, —OCO—, —CH$_2$—, —OCH$_2$—, —COOCH$_2$— or —OCOCH$_2$—, $Z_1$ and $Z_2$ represent a hydrogen or halogen atom, a cyano group or nitro group, $Z_1$ may be the same or different from $Z_2$, l and m are one or more than one each and a total of l and m is three or more than three, the carbon atom marked with * is an asymmetric carbon atom.

DETAILED DESCRIPTION OF THE PREFERRED EMBODIMENTS

Figure 1:
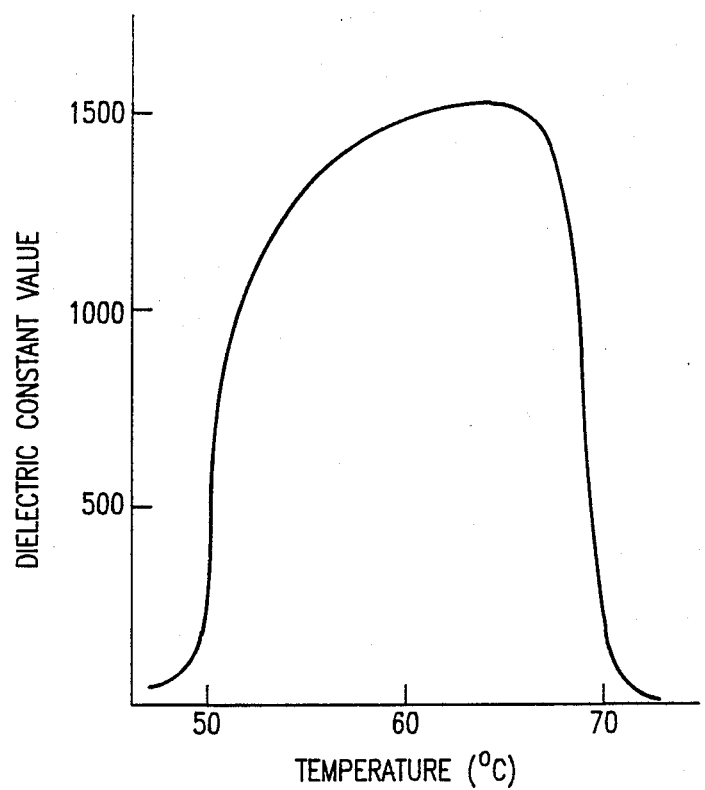
FIG. 1 is the graphical representation of the relationship between the temperatures and the dielectric constant values of embodiments of the liquid crystal compound, (s,s)-1-chloro-2-methylbutylcarbonyloxybenzoic acid-4'-(4''-heptylcarbonyloxyphenyl)-phenyl ester.

In the present specification, a smectic liquid crystal compound is defined as a compound which shows a smectic A phase, a chiral smectic C phase, or any smectic phase under appropriate conditions; and a compound which does not show a smectic phase itself, but emerges in a desirable temperature range for a chiral smectic C phase when mixed with another smectic liquid compound.

An aspect of the present invention is a liquid crystal composition which is the composition of at least two liquid crystal components, for example a composition (2s,3s)-4'-(4''-2-chloro-3-methylpentyloxycarbonyl)-phenyl)phenyl-4-octyloxybenzoic acid ester and (2s, 3s)-2-chloro-3-methylpentyl-4-(4'-nonylcarbonyloxy)-phenyl)benzoic acid ester (28:72) shows a chiral smectic C phase at the range of 8°–52° C. If the compound of the formula (1) does not show a chiral smectic phase itself, it is useful for a dopant of ferroelectric liquid crystal because of having optically active group in the compound.

As mentioned supra, many ferroelectric liquid crystals are known, but ferroelectric liquid crystal which is stable and show a large spontaneous polarization up to 210 nC/cm² is not yet known.

The smectic liquid compound of the present invention is stable, because the structure has at least a biphenyl group unlike such compound as DOBAMBC whose two benzene rings are linked together by an unstable Shiff-base functional group. The smectic liquid crystal compounds of the invention exhibit high spontaneous polarization in the chiral smectic C phase, because they have an optically active group.

One of the compound of formula (2) can be presented according to the following steps:

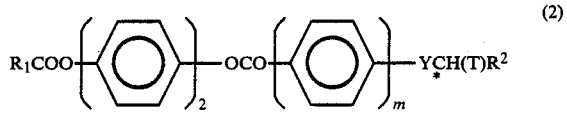
(2)

wherein $R_1$ represents a straight or branched $C_{1-18}$ alkyl group, haloalkyl group, aralkyl group or haloaralkyl group, with or without optically active carbon, $R^2$ represents a straight or branched $C_{1-6}$ alkyl group, haloalkyl group or aralkyl group with or without optically active carbon, Y represents single bond, —O—, —COO—, —OCO—, —CH$_2$—, —OCH$_2$— or —COOCH$_2$—, T represents a halogen atom or a methyl group, m is 1 or 2.

(a) dissolution of 4-alkylcarbonyloxyphenyl phenol and a compound selected from following group with nonactive solvent such as carbon tetrachloride; 4-alkyl benzoic acid, 4-alkoxy benzoic acid, 4-alkylcarbonyloxybenzoic acid, 4-alkylcarbonyloxy benzoic acid, 4-alkyloxycarbonyl benzoic acid, 4'-alkyl-4-biphenyl carboxylic acid, 4'-alkoxy-4-biphenyl carboxylic acid, 4'-alkoxy-4-biphenyl carboxylic acid, 4'-alkylcarbonyloxy-4-biphenyl carboxylic acid, 4'-alkyloxycarbonyl-4-biphenyl carboxylic acid, 4-haloalkyl benzoic acid, 4-haloalkyl carbonyloxy benzoic acid, 4-haloalkyloxy carbonyl benzoic acid, 4'-haloalkyl-4-biphenyl carboxylic acid, 4'-haloalkyl carbonyloxy-4-biphenyl carboxylic acid, 4'-haloalkyloxycarbonyl-4-biphenyl carboxylic acid, 4-aralkyl benzoic acid, 4-aralkylcarbonyloxy benzoic acid, 4-aralkyloxycarbonyl benzoic acid, 4'-aralkyl-4-biphenyl carboxylic acid, 4'-aralkylcarbonyloxy-4-biphenyl carboxylic acid, 4'-aralkyloxycarbonyl-4-biphenyl carboxylic acid, 4-haloaralkyl benzoic acid, 4-haloaralkylcarbonyloxy benzoic acid, 4-haloaralkyloxycarboxylic benzoic acid, 4'-haloaralkyl-4-biphenyl carboxylic acid, 4'-haloaralkyloxycarbonyl-4-biphenyl carboxylic acid, (b) reaction of the phenol with the acid in the presence of dicyclohexylcarbodiimides to afford an ester. It is also obtained by reacting an acid chloride of above mentioned carboxylic acids with 4-alkylcarbonyloxyphenyl phenol in a basic solvent.

The compound presented by a general formula (2) has at least an optically active group and shows ferroelectricity. Optically active group is derived easily from following compounds such as optically active alcohols or carboxylic acids:

2-Halo-1-propanols, 2,3-dihalo-1-propanols, 2,3,3,3-tetrahalo-1-propanols, 2-methyl-1-butanol, 3-methyl-1-pentanol, 4-methyl-1-hexanol, 2-butanol, 2-pentanol, 2-hexanol, 2-heptanol, 2-octanol, 1-phenylethanol, linalool, nerolidol, sobrerol, carbomenthol, menthol, isomethol, borneol, isoborneol, carbenol, cholesterol, 2-halo-2-phenylethanols, 2-phenyl-3-halo-1-propanols, 3-phenyl-2-halo-1-propanols, 1-phenyl-2-halo-1-propanols, 3-halo-2-methyl-1-propanols, 1,1,1-trihalo-2-propanols, 2-halo-1-butanols, 3-halo-1-butanols, 2,3-dihalo-1-butanols, 2,4-dihalo-1-butanols, 3,4-dihalo-1-butanols, 1,1,1-trihalo-2-butanols, 4,4,4-trihalo-3-halo-1-butanols, 2,3,4-trihalo-1-butanols, 3,3,4,4-pentahalo-2-butanols, 2-halo-3-methyl-1-butanols, 2-halo-3,3-dimethyl-1-butanols, 2-halo-1-pentanols, 3-halo-1-pentanols, 4-halo-1-pentanols, 2,4-dihalo-1-pentanols, 2,5-dihalo-1-pentanols, 1,1,1-trihalo-2-pentanols, 1,1,1,2,2-pentahalo-3-pentanols, 2-halo-3-methyl-1-pentanols, 2-halo-4-methyl-1-pentanols, 2-halo-3-monohalomethyl-4-methyl-1-pentanols, 2-halo-1-hexanols, 3-halo-1-hexanols, 4-halo-1-hexanols, 5-halo-1-hexanols, 2,5-dihalo-1-hexanols, 2,6-dihalo-1-hexanols, 1,1,1-trihalo-2-hexanols, 2,5,6-trihalo-1-hexanols, 2-halo-1-heptanols, 1,1,1-trihalo-2-heptanols, 2halo-1-octanols and 1,1,1-trihalo-2-octanols or the corresponding carboxylic acids of the above mentioned compounds.

Some of the optically active alcohols just mentioned can be easily prepared by asymmetric reduction of corresponding ketones by the action of special metal catalysts, or by microbial or enzymic action. Some other optically active acids and alcohols may be derived from optically active amino acids or oxy acids which are found in nature or obtainable by optical resolution, such as valine, leucine, isoleucine, phenylalanine, threonine, homoserine, allo-isoleucine, tert-leucine, 2-aminobutyric acid, norvaline, norleucine, ornitine, lysine, hydroxylysine, phenylglycine, aspartic acid, glutamic acid, mandelic acid, tropic acid, 3-hydroxybutyric acid, malic acid, tartaric acid, and isopropylmalic acid.

Having generally described this invention, a further understanding can be obtained by reference to certain specific examples which are provided herein for purposes of illustration only and are not intended to be limiting unless otherwise specified.

The phase transition temperature values shown in the following examples may vary slightly depending on the method used for measuring the temperature or the purity of the product.

Hereinafter following words are abbreviated as in ( ); crystal (C), chiral smectic C (SC*), smectic A (SA), chiral smectic F (F*), chiral nematic (N*), isotropic phase (I), and the carbon atom marked with * shows an asymmetric carbon atom.

EXAMPLE 1

Preparation and properties of (s)-2-methylbutyl benzoic acid-4'-(4''-heptylcarbonyloxyphenyl)phenyl ester (ACO)

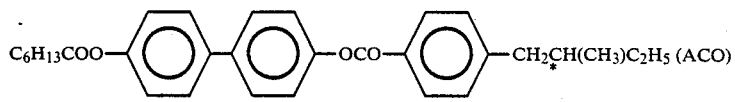

Forty grams of 4,4'-biphenol were dissolved with 30 ml of pyridine. Then 19 ml of heptylcarboxylic acid chloride were dropped into the solution with stirring into the pyridine solution. After heating for one hour, water was added to the mixture to obtain crystals, after separating crystals, the residue were purified by soxhlet-extractor with toluene to obtain crystals of 4-(4'-heptylcarbonyloxyphenyl)phenyl.

Eight grams of the crystals, 6.2 g of dicyclohexylcarbodiimide, 4.5 g of (s)-2-methylbutylbenzoic acid and 4-pyrrolidinopyridine were dissolved with 500 ml of carbon tetrachloride and allowed to stand them for 6 hours. After separating the crystals the residue were passed through a silica-gel column to obtain the compound (ACO). The phase transition points of the obtained compound were shown in table 1.

To measure the dielectric constant of the compound by Sawyer-Tower method, a laminate was formed by disposing 25 μm thickness of polyethylene terephthalate film of which center part lacked using as a spacer in contact with two nesaglasses as an electrode on both sides of the film wherein said space was filled with the compound, and a voltage with 100 Hz of alternative current was applied between said electrodes. The result was shown in FIG. 1.

In the case of applying a voltage with a square wave to the compound, electro-photo-effects such as clear contrast and high speed response corresponding to square waves were observed through making a microscopic observation.

EXAMPLE 2

Many liquid crystal compounds were obtained by the same procedure shown in example 1. The phase transition points of the compounds were shown in table 1.

EXAMPLE 3

Preparation and properties of
(s)-p-(p'-octylcarbonyloxphenyl)benzoic
acid-p''-(2-methylbutyloxycarbonyl)phenyl ester
(AAA)

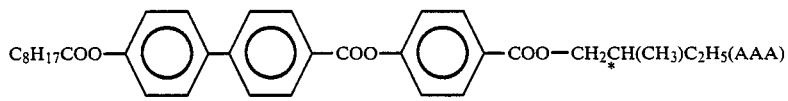

Four point five grams of 4-(4'-hydroxyphenyl)-benzoic acid were dispersed in a mixed solution of 300 ml of carbon tetrachloride and 50 ml of pyridine and then heated. 3.7 g of nonanic chloride was dropped into the mixture with reflux-stirring. After heating for three hours, reducing the solvents and then a small amount of water was added to decompose unreacted nonanic chloride. The residue was washed with methanol to obtain 4-(4'-octylcarbonyloxy)biphenyl carbonic acid (FB). (FB) was dispersed in 200 ml of carbon tetrachloride, then the mixture was reacted with 10 ml of thionyl chloride with reflux-stirring for three hours to obtain crystals of 4-(4'-octylcarbonyloxy)biphenyl carboxylic acid chloride (GC).

One point five grams of (GC) were dissolved with a mixed solvent 10 ml of pyridine and 80 ml of carbon tetrachloride and then cooled. 1.4 g of (s)-4'-(2-methylbutyloxycarbonyl)phenol was added to the mixture with cooling and stirring. The solution was allowed to stand overnight to precipitate crystals. The crystals were separated from the solution by filtrating, then purified by passing through a silica-gel column. And then (AAA) was obtained, after recrystallizing with ethyl acetate. The phase transition points were shown in table 2.

EXAMPLE 4

Preparation and properties of
(s)-p-(p'-octylcarbonyloxyphenyl)benzoic
acid-p''-(2-methylbutylcarbonyloxy)phenyl ester (BD)

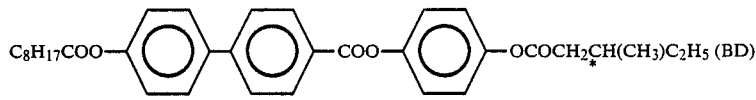

(BD) was obtained by the same procedure shown in example 3 without using (s)-4'-(2-methylbutyloxy)-phenol instead of (s)-4'-(2-methylbutyloxycarbonyl)-phenol. The phase transition points were shown in table 2.

EXAMPLE 5

Preparation and properties of
(s)-p-(p'-octylcarbonyloxyphenyl)benzoic
acid-p''-(2-methylbutylcarbonyloxy)phenyl ester (CE)

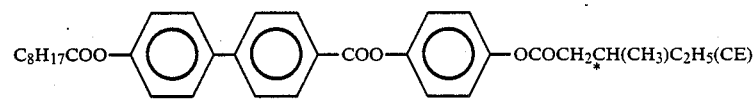

(CE) was obtained by the same procedure shown in example 3 without using (s)-4'-(2-methylbutyloxycarbonyl)phenol instead of (s)-4'-(2-methylbutyloxycarbonyl)phenyl. The phase transition points were shown in table 2.

EXAMPLE 6

Preparation and properties of (s)-p-(p'-octylcarbonyloxyphenyl)benzoic acid-4-(4'-(2''-methylbutyloxycarbonyl)phenyl)-phenyl ester (DF)

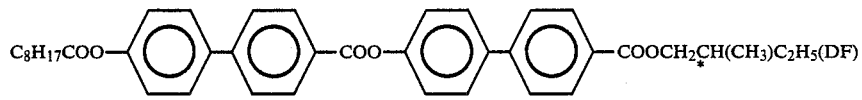

(DF) was obtained by the same procedure shown in example 3 without using (s)-4-(4'-(2''-methylbutyloxycarbonyl)phenol)-phenol instead of (s)-4'-(2-methylbutyloxycarbonyl)phenol. The phase transition points were shown in table 2.

EXAMPLE 7

Preparation and properties of (s)-p-(p'-octylcarbonyloxyphenyl)benzoic acid-p''-(1-methylpropyloxycarbonyl)phenyl ester (EG)

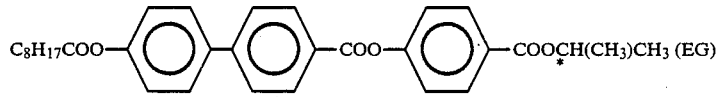

(EG) was obtained by the same procedure shown in example 3 without using (s)-4'-(1-methylpropyloxycarbonyl)phenol instead of (s)-4'-(2-methylbutyloxycarbonyl)phenol. The phase transition points were shown in table 2.

EXAMPLE 8

A composition consisting of (s,s)-3-methyl-2-chloropentyl-4-(4'-nonylcarbonyloxy)-biphenyl carboxylic acid ester (FH)

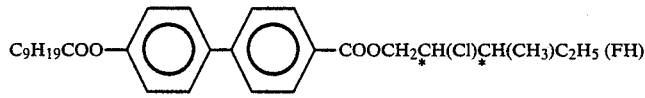

and (s)-p-(p'-octylcarbonyloxyphenyl)benzoic acid-p''-(2-methylbutyloxycarbonyl)phenyl ester (AAA) (74:26) was prepared and the phase transition points of the composition were measured. The results were shown as follows: C-SC*; 14° C., SC*-SA; 46° C. and SA-I; 83°–100° C. The phase transition point SC* of the compound (FH) was 27°–42° C. under condition of increasing temperature. Judging from this results, it was recognized that the temperature range of SC* phase of (FH) were extended by adding (AA).

EXAMPLE 9

Preparation and properties of (s)-4-octylcarbonyloxybenzoic acid-4'-4'''-(2-methylbutyloxycarbonylphenyl)phenyl ester (AI)

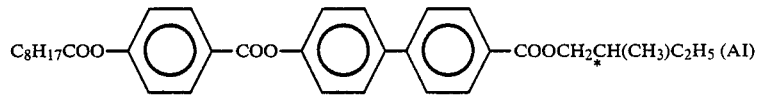

Five grams of 4-(4'-hydroxyphenyl)benzoic acid, 5 g of (s)-2-methylbutylalcohol and 11 g of p-toluenesulfonic acid were dissolved with 50 ml of benzene. Occurred water in the mixture was removed by azotropic dehydration with refluxing for eight hours. After adding 50 ml of water to the residue, the organic phase was concentrated to obtain 4-(4'-hydroxyphenyl)benzoic acid-2-methylbutyl ester (BJ).

2.5 g of 4-octylcarbonyloxybenzoic acid was dispersed in 50 ml carbon tetrachloride, after dropping 10 ml of thionyl chloride to this solution, refluxed for three hours. After reducing the solvent, 4-octylcarbonyloxybenzoic chloride (CK) was obtained.

(CK) was dissolved with 80 ml of carbon tetrachloride and 10 ml of pyridine and then cooled. 2.5 g of (BJ) was added with cooling and stirring, the mixture was allowed to stand overnight to precipitate crude crystals of (AI). The crystals were purified by passing through a silica-gel column and then recrystallized with ethyl acetylate. The phase transition points of (AI) were shown in table 3.

EXAMPLE 10

Preparation and properties of (s)-4-nonylcarbonyloxybenzoic acid-4'-4'''-(2-methylbutylcarbonyloxyphenyl)phenyl ester (DL)

Twelve grams of p,p'-biphenol were dissolved with 50 ml of pyridine after addition of 5 ml of (s)-3-methylpentanic acid to this pyridine solution with stirring for one hour. Then hydrochloric acid was added to neutralize pyridine. After the products were extracted with 200 ml of chloroform, chloroform was removed to obtain a mixture of p,p'-(2-methylbutylcarbonyloxy)-biphenyl and 4-4'-(2-methylbutylcarbonyloxy)biphenol.

4-4'-(2-methylbutylcarbonyloxy)biphenol purified by passing through a silica-gel column was reacted with benzoic acid chloride to obtain the compound, (DL). The phase transition points of (DL) were shown in table 3.

EXAMPLE 11

Preparation and properties of (s)-4-4'-(2-methylbutylcarbonyloxyphenyl)benzoic acid-4''-octylcarbonyloxyphenyl ester (EM)

Four point five grams of 4-(4'-hydroxy)biphenyl carboxylic acid were dispersed in 300 ml of carbon tetrachloride and 50 ml of pyridine and heated.

4 ml of (s)-3-methylpentanic acid chloride was dropped to this solution with refluxing. Then the mixture was heated for three hours. After removing the solvent, a small amount of water was added to the residue to decompose unreacted (s)-3-methylpentanic acid chloride. 6.5 g of (s)-4-4'-(2-methylbutylcarbonyloxy)-biphenylcarbonic acid (FN) was obtained, after washing the residue with methanol. 1.5 g of (FN) was dispersed in 50 ml of carbon tetrachloride, then reacted with 10 ml of thionyl chloride with refluxing for three hours. (s)-4-4'-(2-methylbutylcarbonyloxy)biphenylcarboxylic acid chloride (GO) was obtained after removing the solvents.

One point four grams of 4-octylcarbonyloxyphenol were dissolved with 5 ml of pyridine. Then (GO) dissolved with 80 ml of carbontetrachloride was added to this pyridine solution with stirring. The mixture allowed to stand overnight to precipitate crystals. After filtrating the crystals and removing the solvent by distillation, the residue was purified passing through silicagel column and recrystallized with ethyl acetate to obtain the compound, (EM). The phase transition points of the compound (EM) were shown in table 3.

EXAMPLE 12

Some other compounds were obtained by similar procedure described in examples 9–11. The phase transition points of obtained compounds were shown in table 3.

EXAMPLE 13

A composition consisting of (s)-4-octylcarboxyloxybenzoic acid-4'-4''-(2-methylbutyloxycarbonylphenyl)phenyl ester (AI) and (s)-4-(4'-octylcarbonyloxy)biphenylcarboxylic acid-4''-(2-methylbutyloxycarbonyl)phenyl ester (HP) (68:32) was prepared.

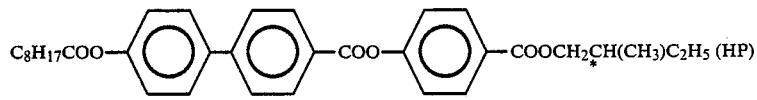

The compound (HP) formed SC* phase at 69°–117° C. under condition of increasing temperature.

The phase transition points of the composition were as follows, C-SI* 41° C., SI*-SC* 45° C., SC*-SA 110° C., SA-N 171° C., N-I 174° C. The results show that the composition consisting of (AI) and (HP) forms SC* phase in more wide temperature range than that of (AI) only.

EXAMPLE 14

Preparation and properties of (2s,3s)-4'-(4''-2-chloro-3-methylpentyloxycarbonyl)-phenyl)phenyl-4-octylcarbonyloxybenzoic acid ester (A)

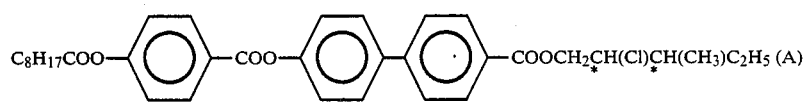

Five grams of (2s,3s)-2-chloro-3-methylpentanol and 7 g of p-toluenesulfonic acid were dissolved with 100 ml of toluene, the mixture was refluxed with dehydrating for 15 hours. 10 g of (2s,3s)-4-(4'-(2-chloro-3-methylpentyloxycarbonyl)phenyl)phenol (B) was obtained by concentrated the toluene layer which was separated from the refluxed mixture by adding water.

Four point five grams of 4-hydroxy benzoic acid were dissolved with a mixed solvent of 5 ml of pyridine and 30 ml of carbon tetrachloride. 3.7 g of nonanic acid chloride was dropped into the mixture solution with refluxing for three hours, a small amount of water added to the residue removed the solvent from the refluxing solution to decompose unreacted nonanic chloride. Then 4-octylcarbonyloxy benzoic acid (C) was obtained after washing methanol. (C) was dispersed in 20 ml of carbon tetrachloride, after adding 5 ml of thionyl chloride, the mixture was refluxed for three hours to obtain 6.5 g of 4-octylcarbonyloxybenzoic acid chloride. 1.5 g of (D) was dissolved with 80 ml of carbon tetrachloride and 10 ml of pyridine and then cooled, 1.7 g of (B) was added to this solution with stirring under ice-cooled condition and the mixture was allowed to stand overnight to precipitate crystals. Following separation of produced crystals and reduction of solvents, the residue was purified by passing through a silica-gel column to obtain crude crystals of (A). Crude (A) was recrystallized with ethyl acetate. Purified (A) was smectic liquid crystal compound having SC* phase. The phase transition points of (A) were shown in table 4. (A) showed a large spontaneous polarization up to 109 nC/cm$^2$ by Sawyer-Tower method described in example 1. When applied a voltage with a square wave to (A), electro-photo-effects of clear contrast and high speed response were observed.

EXAMPLE 15

Preparation and properties of (s)-4′-(4″-(1-chloro-2-methylpropylcarbonyloxy)-phenyl)phenyl-4-octylcarbonyloxybenzoic acid ester (E)

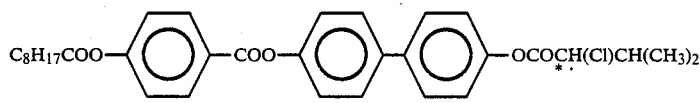

Twenty five ml of (s)-2-chloro-3-methylbutanic acid chloride was dropped into 200 ml of pyridine dissolved 47 g of 4,4′-biphenol with stirring. The crude 4-(4′-(1-chloro-2-methylpropylcarbonyloxyphenyl)phenol (F) was obtained by extracting with chloroform from the pyridine solution, after neutralizing with hydrogen chloride. 20 g of crude (F) was obtained by passing through a silica-gel column. 4-octylcarbonyloxybenzoic acid chloride, (D) was reacted with (F) to obtain the compound (E) by same procedure mentioned in example 14. The phase transition points of the compound (E) were shown in table 4.

EXAMPLE 16

A preparation and properties of (s)-4‴-octylcarbonyloxyphenyl-4-(4′-(1-chloro-2-methylpropylcarbonyloxy)phenyl)benzoic acid ester (G)

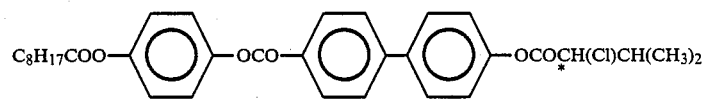

Three point five grams of 4-(4′-hydroxyphenyl)benzoic acid were dispersed in a mixed solvent of 30 ml of carbon tetrachloride and 5 ml of pyridine and then heated. 2.5 ml of (s)-2-chloro-3-methylbutanic acid chloride was dropped into the mixed solution with refluxing for 3 hours. After removing the solvent, a small amount of water was added to decompose unreacted nonanic acid chloride. (s)-4-(4′-(1-chloro-2-methyl-propylcarbonyloxy)phenyl)benzoic acid (H) after washing the residue with methanol. 5 ml of thionylchloride was reacted with the compound (H) dispersed in 20 ml of carbon tetrachloride to obtain 6.5 g of (s)-4-(4′-(1-chloro-2-methylpropylcarbonyloxy)phenyl)benzoic acid chloride (I).

After adding 17 g of nonanic acid chloride to 200 ml of pyridine dissolved with 47 g of hydroquinone, the mixture was heated for 2 hours. Following neutralization of hydrogen chloride, the crude of 4-octylcarbonyloxyphenol was obtained by extracting with chloroform. The crude compound was purified by passing through silica-gel column to obtain pure 4-octylcarbonyloxyphenol (J). (I) was reacted with (J) to obtain the compound (G) same procedure as example 14. (G) was a smectic liquid crystal compound having the SC* phase. The phase transition points of (G) were shown in table 4.

EXAMPLE 17

Preparation and properties of (2s,3s)-4″-(2-chloro-3-methylpentyloxycarbonyl)phenyl-4-(4′-octylcarbonyloxyphenyl)benzoic acid ester (K)

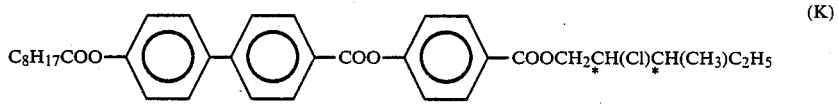

(K) was obtained by same procedure as example 14, without using 4-(4′-hydroxyphenyl)benzoic acid and 4-hydroxy benzoic acid instead of each 4-hydroxybenzoic acid and 4-(4′-hydroxyphenyl)benzoic acid. (K) was smectic liquid crystal compound having the SC* phase. The phase transition points of (K) were shown in table 4.

EXAMPLE 18

Preparation and properties of (s)-4‴-(1-chloromethylpropylcarbonyloxy)phenyl)-4-(4′-octylcarbonyloxy)phenyl-4-(4′-octylcarbonyloxyphenyl)benzoic acid (L)

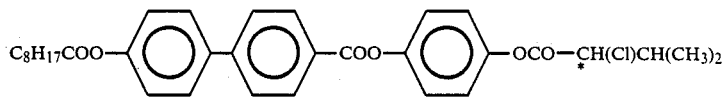

(L) was obtained by same procedure as example 15 without using 4-(4′-hydroxyphenyl)benzoic acid and hydroxyquinone instead of each 4-hydroxybenzoic acid ad 4-4′-biphenol.

(L) was a smectic liquid crystal compound having SC* phase. The phase transition points of (L) were shown in table 4.

EXAMPLE 19

Preparation and properties of
(s)-4'-(4'''-nonylcarbonyloxyphenyl)phenyl-4-(1-chloro-2-methylpropylcarbonyloxy) benzoic acid ester (W)

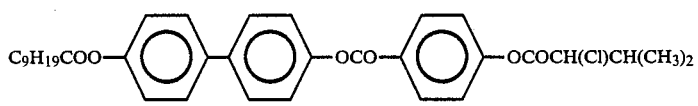
(W)

(W) was obtained by same procedure as example 16 without using 4-hydroxy benzoic acid and 4-4'-biphenol instead of each 4-4'-hydroxyphenyl benzoic acid and hydroxyquinone. (W) was a smectic liquid crystal compound having SC* phase. The phase transition points of (W) were shown in table 4.

EXAMPLE 20

Preparation and properties of
(s)-4'-(4'''-octylcarbonyloxy)phenyl)-4-(4'-(1-chloro-2-methylpropylcarbonyloxy)phenyl) benzoic acid ester (M)

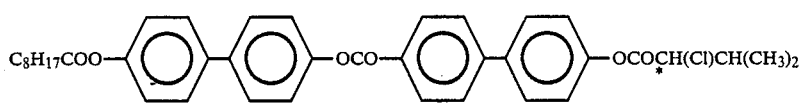
(M)

(M) was obtained by same procedure as example 16 without using 4-4'-bophenol instead of hydroquinone. (M) was a smectic liquid crystal compound having SC* phase. The phase transition points of (M) were shown in table 4.

EXAMPLE 21

Preparation and properties of
(s)-4'-(4'''-octylphenyl)phenyl-4-(1-chloro-2-methylpropylcarbonyloxy) benzoic ester (N)

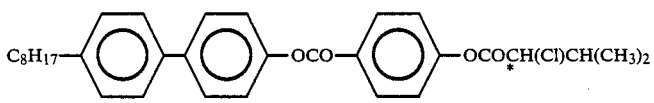
(N)

A mixture of 38 g of 4-phenylphenol, 9 g of sodium hydroxide, 200 ml of methanol and 20 ml of water was heated. 28 g of dimethyl sulfate was dropped in the mixture with stirring at 50° C. After one hour, 20 ml of 10N-sodium hydroxide was dropped in the solution and continued stirring for 2 hours. The crystals were obtained after the solution was cooled to room temperature. After washing with water and methanol for several times, 30 g of 4-methoxybiphenyl (O) was obtained. 154 g of (O) was dissolved with mixed solution of 200 ml of chloroform and 75 ml of carbon tetrachloride, and then 11 g of aluminum chloride powder was added to the solution. 14 g of octanic acid chloride was added to the solution with stirring after changing colour of the solution to greenish blue. 150 ml of ice-water and 5 ml of conc. hydrochloric acid was added, after refluxing 5 hours. The water layer was removed, then the organic layer was washed with 0.1N hydrochloric acid and dehydrated with magnesium sulfate anhydride, and then evaporated after filtration to obtain crude crystals of 4'-nonylcarbonyloxy-4-methoxybiphenyl (P). 13 g of (P), 1 g of 10% palladium-carbon, 130 ml of acetic acid were put into an autoclave and then gave the pressure to 25 kg/cm² by using hydrogen. (P) was reduced by heating for 3 hours at 80° C. After substituting nitrogen for hydrogen, palladium-carbon was separated by filtrating the reacted solution. 4'-decyl-4-methoxybiphenyl (Q) was obtained after cooling and drying. 8 g of (Q), 90 ml of acetic acid 30 ml of hydrogen bromide water solution were mixed and refluxed for 5 hours to obtain crude crystals. After cooling, the crude crystals were washed with methanol to crystallize 5.5 g of 4-(4'-octylphenyl)phenol.

A mixture of 1 g of (s)-4-(1-chloro-2-methylpropylcarbonyloxy) benzoic acid (T), 0.8 g of N,N'-dicyclohexylcarbodiimide and 0.1 g of 4-pyrrolidinopyridine were mixed and then allowed to stand overnight in 50 ml of carbon tetrachloride to crystallize the crude compound (N). (N) was obtained by recrystallizing with ethyl acetate after purifying by silica-gel column.

(N) was a smectic liquid crystal compound having SC* phase, and the phase transition points of (N) were shown in table 4.

EXAMPLE 22

Preparation and properties of
(s)-4'''-octyloxyphenyl-4-(4'-(1-chloro-2-methylpropylcarboxyloxy)phenyl)benzoic acid ester (U)

(N)

The compound (U) was obtained by reacting 4-octyloxyphenol with the compound (I) shown in example 16 using the same procedure as example 16. (U) was a smectic liquid crystal compound. The phase transition points of (U) were shown in table 4.

EXAMPLE 23

Preparation and properties of (s)-4'-(4"-nonyloxycarbonyloxy)phenyl)phenyl-4-(1-chloro-2-methylpropylcarbonyloxy)benzoic acid ester (V)

EXAMPLE 25

Preparation and properties of (2s,3s)-4'-(4"-(2-chloro-3-methylpentyloxycarbonyl)phenyl)phenyl-3-chloro-4-octylcarbonyloxybenzoic acid ester (AD)

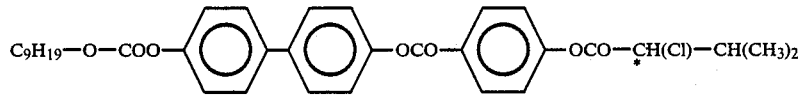

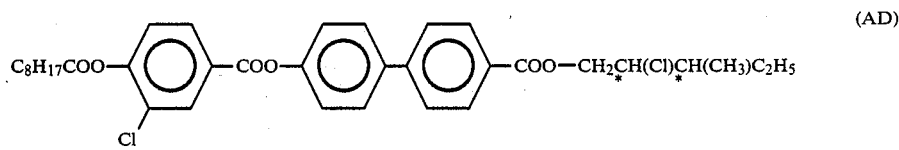

(AD)

The compound (V) was obtained by same procedure as example 16 without using 4-hydroxybenzoic acid, 4-4'-biphenol and nonyloxycarboxylic acid chloride instead of each 4-(4'-hydroxyphenyl)benzoic acid, hydroquinone and nonanic acid chloride. (V) was a smectic liquid crystal compound. The phase transition points of (V) were shown in table 4.

EXAMPLE 24

Preparation and properties of (s)-4'-(4"-octyloxycarbonylphenyl)phenyl-4-(1-chloro-2-methylpropylcarbonyloxy)benzoic acid ester (AA)

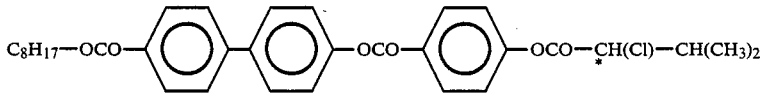

Fifteen grams of n-octanol, 7.5 g of 4-(4'-hydroxyphenyl)benzoic acid and 7.0 g of p-toluenesulfonic acid were dissolved with 100 ml of toluene in a three necked flask with a dehydration apparatus, and the mixture was refluxed for 15 hours. Water was added to the mixture to separate a toluene layer. Ten grams of 4-(4'-octyloxycarbonylphenyl)phenol (AB) were obtained by removing the toluene layer under reduced pressure followed concentration. (s)-4-(1-chloro-2-methylpropylcarbonyloxy)benzoic acid dispersed in 20 ml of carbon tetrachloride was reacted with 5 ml of thionyl chloride by refluxing for 3 hours. After removing the solvent (s)-4-(1-chloro-2-methylpropylcarbonyloxy)benzoic chloride (AC) was obtained. 1.5 g of (AC) was dissolved with mixed solvent of 80 ml of carbon tetrachloride and 10 ml of pyridine, and then 1.7 g of (AB) was added to the mixed solution with cooling and the mixture was allowed to stand overnight to obtain crystals.

After removing the crystals and solvent, the residue was purified by passing through silica-gel column and then the compound (AA) was recrystallized with ethyl acetate.

Four point five grams of 3-chloro-4-hydroxybenzoic acid were dispersed in a mixed solvent of 30 ml of carbon tetrachloride and 5 ml of pyridine and then heated. 3.7 g of nonanic acid chloride was dropped into the mixture with refluxing. After heating 3 hours the solvent was removed from the mixture. After decomposing unreacted nonanic acid chloride by adding a small amount of water, the residue was washed with methanol to obtain 3-chloro-4-octylcarbonyloxybenzoic acid (AE). After dispersing the compound (AE) into 20 ml of carbon tetrachloride, (AE) was reacted with 5 ml of thionyl chloride with refluxing for 3 hours. 6.5 g of 3-chloro-4-octylcarbonyloxybenzoic acid chloride (AF) was obtained after removing solvent.

One point five grams of (AF) was dispersed in mixed solvent of 80 ml of carbon tetrachloride and 10 ml of pyridine and then cooled. 1.7 g of (B) was added to this mixture with stirring under ice-cooled condition, and the mixture was allowed to stand overnight to obtain crystals. After removing the crystals and solvents, the residue was purified by passing through silica-gel column to obtain crude compound of (AD). (AD) was recrystallized with ethyl chloride. (AD) was a smectic liquid crystal compound of which the phase transition points were shown in table 1.

EXAMPLE 26

Some other compounds of this invention were prepared by same procedure as examples 1-15 and the phase transition points of their compounds were shown in table 4.

EXAMPLE 27

A composition of which the ratio of (2s,3s)-4'-(4"-(2-chloro-3-methylpentyloxycarbonyl)phenyl)phenyl-4-octyloxybenzoic acid ester,

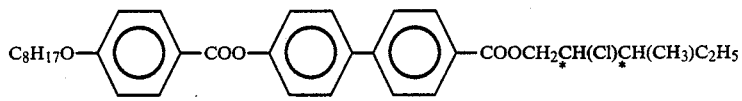

to (2s,3s)-2-chloro-3-methylpentyl-4-(4'-nonylcarbonyloxy)phenyl)benzoic acid ester,

was 28 to 72 showed a chiral smectic C phase at 8°-52° C. The dielectric constant value of this composition was measured by the Sawyer-Tower method, the results showed that the composition had spontaneous polarization of which value was maximum 78 nC/cm².

In the following tables 1-4, a black dot ( • ) shows each that the compound forms the phase corresponding to an abbreviated word, upper black dots and figures in a same column show the results measured under condition at raising temperature and lower them show the results measured under condition at decreasing temperature.

The carbon atom marked with * in a general formula represents optically active carbon atom. The following words of a crystal, chiral smectic I phase, chiral smectic C phase, chiral smectic F phase, smectic A phase, cholesteric phase, isotropic phase and uncharacterized smectic phase, chiral nematic phase were abbreviated to C, SI*, SC*, SF*, SA, Ch, I, $S_{1-3}$, N* each.

TABLE 1

$R^1COO$—◯—◯—OCO—◯—YCH(T)$R^2$

| $R^1$ Cn | Y | T | $R^2$ | C | SI* | SC* | SA | I |
|---|---|---|---|---|---|---|---|---|
| | | | | | (S3) | (Ch) | | |
| 7 | —CH₂— | —CH₃ | —C₂H₅ | • 115 | • 127 | • | 168 | • |
| | | | | • 115 | • 127 | • | 168 | • |
| 8 | —COO—CH₂— | —CH₃ | —C₂H₅ | • 119 | • 155 | • 165 | 176 | • |
| | | | | • 119 | • 155 | • 165 | 176 | • |

TABLE 2

$R^1COO$—◯—◯—COO—(◯)$_m$—YCH(CH₃)$R^2$

| $R^1$ Cn | m | Y | $R^2$ | C | SF* | SC* | SA | N* | N* | I |
|---|---|---|---|---|---|---|---|---|---|---|
| 8 | 1 | —COOCH₂— | —C₂H₅ | • | | 69 • | 117 • | | | 182 • |
| | | | | • | | 50 • | 117 • | | | 182 • |
| 8 | 1 | —OCH₂— | —C₂H₅ | • | 111 • | | 156 • | | | 185 • |
| | | | | • | 111 • | | 156 • | | | 185 • |
| 8 | 1 | —OCOCH₂— | —C₂H₅ | • | | 104 • | 182 • | 191 • | | 207 • |
| | | | | • | | 104 • | 182 • | 191 • | | 207 • |
| 8 | 2 | —COOCH₂— | —C₂H₅ | • | | 114 • | 210 • | 327 • | 328–335 • | |
| | | | | • | | 114 • | 210 • | 325 • | 325–333 • | |
| 8 | 1 | —OCO— | —C₂H₅ | • | | 81 • | 91 • | | | 117 • |
| | | | | • | | 77 • | 91 • | | | 117 • |
| 8 | 1 | —O— | —C₆H₇ | • | | 92 • | 120 • | | | 154 • |
| | | | | • | | 92 • | 120 • | | | 154 • |

TABLE 3

$R^1COO$—◯—X—(◯)$_m$—YCH(CH₃)$R^2$

| $R^1$ Cn | m | X | Y | $R^2$ | C | SI* | SC* | SA | N* | I |
|---|---|---|---|---|---|---|---|---|---|---|
| 8 | 2 | —COO— | —COO—CH₂— | C₂H₅ | • | 73 • | 124 • | 161 • | | 168 • |
| | | | | | • | 45 • | 124 • | 161 • | | 168 • |
| 8 | 2 | —COO— | —COO— | C₂H₅ | • | | 88 • | | | 146 • |
| | | | | | • | | 72 • | | | 146 • |
| 8 | 2 | —OCO— | —OCO—CH₂— | C₂H₅ | • | 104 • | | 163 • | | 200 • |
| | | | | | • | 104 • | | 163 • | | 200 • |
| 8 | 2 | —COO— | —OCO—CH₂— | C₂H₅ | • | 112 • | | 165 • | | 188 • |

TABLE 3-continued $$R^1COO-\underset{}{\bigcirc}-X\underset{m}{\left(\bigcirc\right)}-YCH(CH_3)R^2$$
                                                      *

| R¹ Cn | m | X | Y | R² | Phase transition point (°C.) |||||||
|---|---|---|---|---|---|---|---|---|---|---|---|
|  |  |  |  |  | C | | SI* | SC* | SA | N* | I |
|  |  |  |  |  | • | | 111 • | | 165 • | 189 • | |

TABLE 3

$$R^1W-\underset{l}{\left(\bigcirc\right)}-X\underset{l}{\left(\bigcirc\right)}-YCH(T)R^2$$
                                                     *

| R¹ Cn | l | m | w | X | Y | —CH(T)R² * | Phase transition point (°C.) |||||||
|---|---|---|---|---|---|---|---|---|---|---|---|---|---|
|  |  |  |  |  |  |  | C | | SI* | SC* | SA | N* | I |
| 8 | 1 | 2 | —COO— | —COO— | —COO—CH₂— | —CH(Cl)—CH(CH₃)—C₂H₅ * * | • | | 70 • | 130 • | 150 • | 150 • | |
| 8 | 1 | 2 | —COO— | —COO— | —OCO— | —CH(Cl)—CH(CH₃)₂ * | • | | 124 • | | 188 • | 208 • | |
| 8 | 1 | 2 | —COO— | —OCO— | —OCO— | —CH(Cl)—CH(CH₃)₂ * | • | 91 • | 96 • | 162 • | 197 • | 203 • | |
| 8 | 2 | 1 | —COO— | —COO— | —COO—CH₂— | —CH(Cl)—CH(CH₃)—C₂H₅ * * | • | | 84 • | 125 • | | 176 • | |
| 8 | 2 | 1 | —COO— | —COO— | —COO—CH₂— | —CH(Cl)—CH(CH₃)₂ * * | • | | 84 • | 129 • | | 178 • | |
| 8 | 2 | 1 | —COO— | —COO— | —OCO— | —CH(Cl)—CH(CH₃)₂ * | • | 68 • | 85 • | 150 • | 185 • | 198 • | |
| 6 | 2 | 1 | —COO— | —OCO— | —OCO— | —CH(Cl)—CH(CH₃)₂ * | • | | 120 • | | 173 • | 200 • | |
| 9 | 2 | 1 | —COO— | —OCO— | —OCO— | —CH(Cl)—CH(CH₃)₂ * | • | 100 • | 107 • | | 177 • | 188 • | |
| 11 | 2 | 1 | —COO— | —OCO— | —OCO— | —CH(Cl)—CH(CH₃)₂ * | • | 105 • | 116 • | | 185 • | 191 • | |
| 7 | 2 | 1 | —COO— | —COO— | —COO—CH₂— | —CH(Cl)—CH(CH₃)—C₂H₅ * * | • | | 80 • | 100 • | | 173 • | |
| 10 | 2 | 1 | —COO— | —COO— | —COO—CH₂— | —CH(Cl)—CH(CH₃)—C₂H₅ * * | • | | 75 • | 134 • | | 167 • | |
| 7 | 2 | 1 | —O— | —OCO— | —OCO— | —CH(Cl)—CH(CH₃)₂ * | • | | 119 • | | 158 • | 197 • | |
| 14 | 2 | 1 | —O— | —OCO— | —OCO— | —CH(Cl)—CH(CH₃)₂ * | • | | 115 • | | 156 • | 162 • | |
| 8 | 1 # | 2 | —COO— | —COO— | —COO—CH₂— | —CH(Cl)—CH(CH₃)—C₂H₅ * * | • | | 87 • | | 98 • | 126 • | |
| 8 | 1 # | 2 | —COO— | —COO— | —OCO— | —CH(Cl)—CH(CH₃)—C₂H₅ * * | • | | 85 • | | 123 • | 138 • | |
| 8 | 2 | 1 # | —COO— | —COO— | —COO—CH₂— | —CH(Cl)—CH(CH₃)—C₂H₅ * * | • | | | | 109 • | 122 • | |
| 8 | 2 | 2 | —COO— | —OCO— | —OCO— | —CH(Cl)—CH(CH₃)₂ * | • | 83 • | 153 • | | 200 | | |
| 8 | 1 | 2 | —O— | —COO— | —COO—CH₂— | —CH(Cl)—CH(CH₃)—C₂H₅ * * | • | | 88 • | 117 • | 149 • | 150 • | |
| 8 | 1 | 2 | —O— | —OCO— | —OCO— | —CH(Cl)—CH(CH₃)₂ * | • | | 77 • | 144 • | 192 • | 195 • | |
| 8 | 2 | 1 | —O— | —COO— | —COO—CH₂— | —CH(Cl)—CH(CH₃)₂ * * | • | | 98 • | 124 • | | 168 • | |
| 8 | 2 | 1 | —O— | —OCO— | —OCO— | —CH(Cl)—CH(CH₃)₂ * | • | | 106 • | 133 • | 138 • | 158 • | |
| 8 | 2 | 1 |  | —OCO— | —OCO— | —CH(Cl)—CH(CH₃)₂ * | • | | 106 • | 133 • | 138 • | 158 • | |
| 9 | 2 | 1 | —O—COO— | —OCO— | —OCO— | —CH(Cl)—CH(CH₃)₂ * | • | 85 • | 91 • | | 149 • | 170 • | |
| 5 | 2 | 1 | —OCO— | —OCO— | —OCO— | —CH(Cl)—CH(CH₃)₂ * | • | | 92 • | 119 • | 172 • | 175 • | |
| 8 | 2 | 1 | —OCO— | —OCO— | —OCO— | —CH(Cl)—CH(CH₃)₂ * | • | | 65 • | 98 • | | 160 • | |

TABLE 3-continued $R^1W-(\bigcirc)_l-X-(\bigcirc)_l-YCH(T)R^2$

| R¹ Cn | l | m | w | X | Y | —CH(T)R² | C | SI* | SC* | SA | N* | I |
|---|---|---|---|---|---|---|---|---|---|---|---|---|
| 2 | 2 | 1 | —OCO— | —OCO— | —OCO— | —CH(Cl)—CH(CH₃)—C₂H₅ | • | 60 • | 94 • | | 140 • | |

A carbon atom marked * or ** represents S or R type of absolute configuration of carbon atom A number marked with * shows that a phenyl group corresponding to the number is 3-chloro phenyl group, —⟨◯⟩— with Cl

What is claimed is:

1. A liquid crystal compound represented by the following formula:

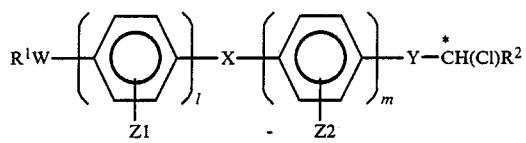

wherein R¹ is a straight C₆₋₁₈ alkyl group, R² is a branched C₃₋₆ alkyl group with or without an optically active carbon, W is a single bond, —O—, —COO—, —OCO— or —OCOO—, X is —OCO— or —COO—, Y is —COOCH₂—, Z1 and Z2 are a hydrogen or halogen atom, Z1 may be the same or different from Z2, l and m are one or two, and the sum of l and m is three.

2. A liquid crystal compound presented by the following formula:

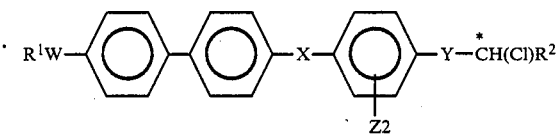

wherein R¹ is a straight C₆₋₁₈ alkyl group, R² is a branched C₃₋₆ alkyl group with or without an optically active carbon, W is a single bond, —COO—, —O—, —OCOO— or —OCO—, X is —COO— or —OCO—, Y is —COOCH₂— and Z2 is hydrogen or halogen atom.

3. A liquid crystal compound represented by the following formula:

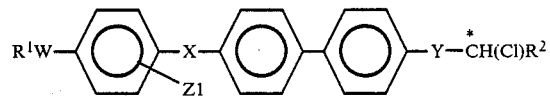

wherein R¹ is a straight C₆₋₁₈ alkyl group, R² is a branched C₃₋₆ alkyl group with or without an optically active carbon, W is a single bond, —COO— or —O—, X is —COO— or —OCO—, Y is —COOCH₂— and Z1 is a hydrogen or halogen atom.

4. A liquid crystal composition comprising at least two components, at least one of which is a smectic liquid crystal compound represented by the following formula as a component,

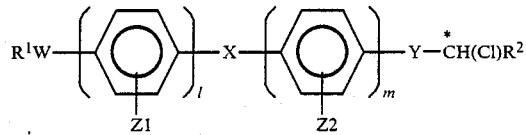

wherein R¹ is a straight C₆₋₁₈ alkyl group, R² is a branched C₃₋₆ alkyl group with or without an optically active carbon, W is a single bond, —COO—, —OCO—, —O— or —OCOO—, X is —OCO— or —COO—, Y is —COOCH₂—, Z1 and Z2 are a hydrogen or halogen atom, Z1 may be the same or different from Z2, and l and m are one or two and the sum of l and m is three.

* * * * *